United States Patent
Suzuki et al.

(10) Patent No.: US 7,248,414 B2
(45) Date of Patent: Jul. 24, 2007

(54) PLASTIC OPTICAL COMPONENTS AND AN OPTICAL UNIT USING THE SAME

(75) Inventors: Fumiyuki Suzuki, Tokyo (JP); Noriko Eiha, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 49 days.

(21) Appl. No.: 11/300,409

(22) Filed: Dec. 15, 2005

(65) Prior Publication Data

US 2006/0215281 A1    Sep. 28, 2006

(30) Foreign Application Priority Data

Mar. 23, 2005   (JP) ............................. 2005-083451

(51) Int. Cl.
*G02B 3/00* (2006.01)
(52) U.S. Cl. ..................................... 359/642
(58) Field of Classification Search ............... 359/642
See application file for complete search history.

(56) References Cited

U.S. PATENT DOCUMENTS

| | | | |
|---|---|---|---|
| 5,327,180 A * | 7/1994 | Hester et al. | 351/165 |
| 5,905,599 A | 5/1999 | Nomura et al. | |
| 6,278,554 B1 | 8/2001 | Aratani et al. | |
| 7,031,070 B2 * | 4/2006 | Suzuki et al. | 359/642 |
| 2004/0247901 A1 | 12/2004 | Suzuki et al. | |

FOREIGN PATENT DOCUMENTS

| | | |
|---|---|---|
| JP | 11-109107 A | 4/1999 |
| JP | 2000-137166 A | 5/2000 |
| JP | 2002-148402 A | 5/2002 |
| JP | 2004-361732 A | 12/2004 |

* cited by examiner

*Primary Examiner*—Scott J. Sugarman
(74) *Attorney, Agent, or Firm*—Sughrue Mion, PLLC

(57) ABSTRACT

The present invention provides a plastic optical component. The plastic optical component has superior characteristics including lightweightness, low cost and suitability for mass production. The plastic optical component exhibits superior moisture barrier quality while experiencing no uneven refractive index profile in their interior even if they are subjected to the effect of water in the environment. The plastic optical component has an optical component's body. A moisture-proof coating is directly or indirectly formed at least on surfaces of the optical component's body in contact with outside air. The moisture-proof coating is a multi-layered film including a lower inorganic layer and an upper organic layer. Sherwood number describing a water transfer process of the plastic optical component is in a range of 0.1 to 10, both inclusive.

13 Claims, 2 Drawing Sheets

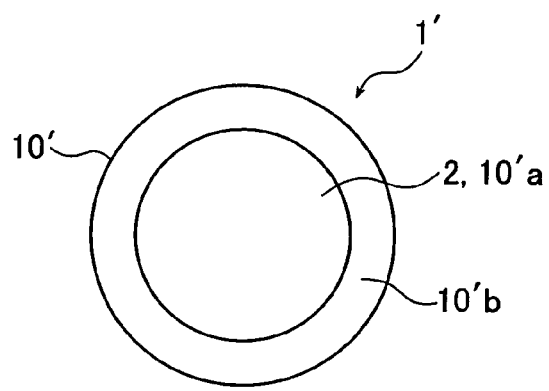
FIG. 3A
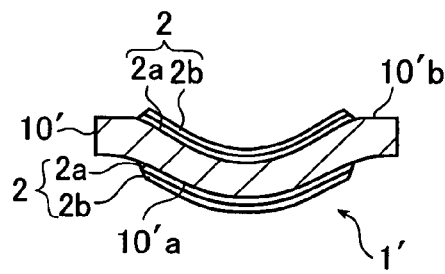
FIG. 3B
FIG. 4
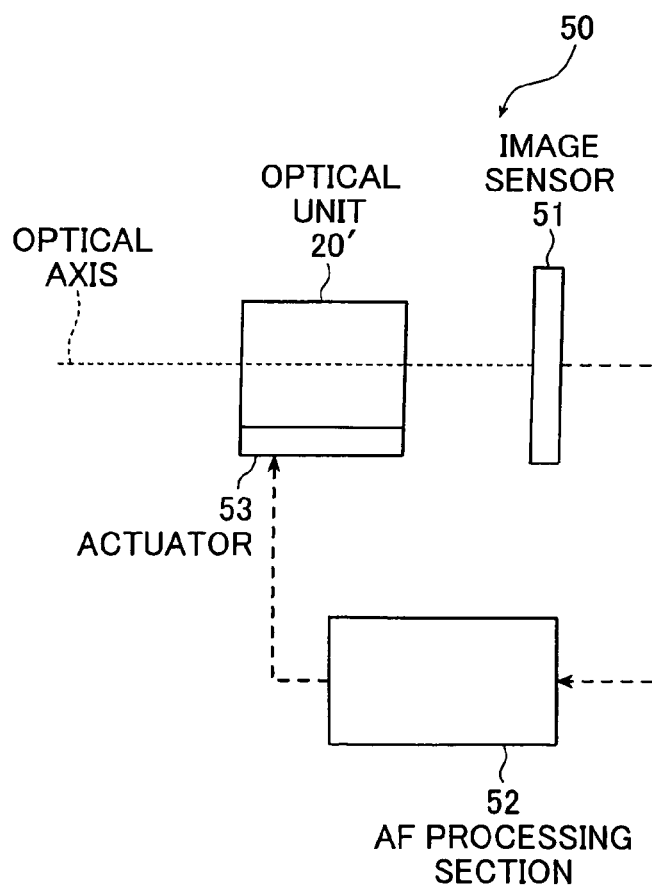

PLASTIC OPTICAL COMPONENTS AND AN OPTICAL UNIT USING THE SAME

The entire contents of literatures cited in this specification are incorporated herein by reference.

FIELD OF THE INVENTION

This invention relates to the technical field of optical components such as lens and prism that are made of plastics, more particularly to plastic optical components that experience extremely small changes in optical performance due to moisture absorption. This invention also relates to an optical unit using such plastic optical components.

Conventionally, camera lenses and a variety of lenses used in finders, copy equipment, printers, projectors and optical communications, as well as optical components including prisms, spectacle lenses, contact lenses and magnifiers are mostly manufactured from glass.

However, with the recent progress in plastic materials and in the plastics molding technology, it has become possible to manufacture lenses, prisms and other optical components at low cost using plastics which are made from cheap materials, lightweight and suitable for mass production.

The problem with plastics is that their optical performance parameters such as refractive index will change upon moisture absorption, so glass is still employed in uses that require high precision (i.e., high resolution) as exemplified by lenses in high-end SLR cameras.

With a view to solving this problem, attempts are being made to develop plastic materials having high moisture barrier properties, namely, low hygroscopicity by various approaches such as designing special polymer structures. However, the cost of such attempts is so high as to sacrifice the economical advantage of plastics themselves.

In order to make optical components of high moisture barrier properties from plastics, it is currently practiced to add hydrophobic substances at a production stage such as molding of an optical component, or cover it with a barrier film impervious to moisture, or provide an anti-reflection film on the optical component and cover its top surface with a coating layer that is subsequently rendered water- and oil-repellant (see JP 2002-148402 A). It is also known to improve the moisture stability of a plastic optical component by forming a hygroscopicity adjusting film only in an area from which a gate has been removed (see JP 11-109107 A). Another approach that is in current practice is fitting an optical system with at least one optical block made of a low-hygroscopicity material to ensure that changes in the performance of the optical system upon moisture absorption are optically compensated (see JP 2000-137166 A).

However, the moisture-proof plastic optical component made by the prior art method just described above and the plastic optical component described in JP 2002-148402 A which has the barrier film and the anti-reflection layer covered with the water- and oil-repellant coating layer are incapable of securing satisfactory moisture barrier properties and hence have had the disadvantage of failing to prevent refractive index and other optical performance parameters from changing upon moisture absorption. According to the technology described in JP 11-109107 A, the hygroscopicity adjusting film is provided only in the area where the gate has been removed but it is substantially difficult to ensure that the rate of moisture absorption from the surrounding areas is held constant. A further problem with the technology described in JP 2000-137166 A is that it provides a complex and costly optical system.

SUMMARY OF THE INVENTION

An object, therefore, of the present invention is to solve the aforementioned problems of the prior art by providing plastic optical components which, in addition to the superior characteristics of plastic optical components per se such as lightweightness, low cost and suitability for mass production, exhibit superior moisture barrier properties while experiencing extremely small changes in refractive index or other optical performance even if they are subjected to the effect of water in the environment.

Another object of the present invention is to provide an optical unit using the plastic optical components.

Commonly assigned JP 2004-361732 A describes that, when a plastic optical component that was left to stand in an atmosphere of 20% RH at 40° C. for 30 days and then in an atmosphere of 90% RH at 40° C. for another 30 days has the characteristic that its weight increase upon moisture absorption is 0.1 wt % or less, the plastic optical component has excellent moisture barrier properties and experiences extremely small changes in optical performance even if it is subjected to the effect of water in the environment. JP 2004-361732 A describes that the above properties can be imparted to a plastic optical component by coating surfaces of the plastic optical component with a multi-layered film including a lower inorganic layer and an upper organic layer.

The present inventors made intensive studies on the changes that would occur to the optical performance of plastic optical components due to moisture absorption. As a result, they found that the changes in the optical performance of plastic optical components due to moisture absorption were caused by the optically undesirable or uneven refractive index profile that had occurred inside the optical components. They also found that the Sherwood number describing the water transfer process has a proper numeric value to prevent the refractive index profile from being optically undesirable or uneven. The present invention has been accomplished on the basis of this finding.

In order to attain the above-mentioned object, the present invention provides a plastic optical component comprising:

an optical component's body; and a moisture-proof coating which is directly or indirectly formed at least on surfaces of the optical component's body in contact with outside air, and is a multi-layered film including a lower inorganic layer and an upper organic layer, wherein Sherwood number describing a water transfer process is in a range of 0.1 to 10, both inclusive.

In the plastic optical component of the present invention, it is preferable that the inorganic layer be mainly made of at least one inorganic material selected from the group consisting of a silicon oxide, a silicon nitride, a silicon oxynitride, a metal oxide, a metal nitride, a metal oxynitride and diamondlike carbon, and a combination thereof, and the organic layer be mainly made of at least one organic material selected from the group consisting of an acrylic resin, a methacrylic resin, a polyester resin, an aromatic polyester resin, polyethylene terephthalate, polyethylene, polypropylene and polystyrene, and a combination thereof.

In the plastic optical component of the present invention, it is further preferable that the inorganic layer be mainly made of at least one inorganic material selected from the group consisting of a silicon oxide, a silicon nitride and a silicon oxynitride.

In the plastic optical component of the present invention, it is preferable that the optical component's body be made of at least one plastic materials selected from the group of methacrylic resins, acrylic resins including alicyclic ones, polycarbonate resins, polyester resins including aromatic ones, polystyrene resins, acrylonitrile-styrene resins, alicyclic polyolefins, resins containing the tricyclodecane ring, cycloolefinic polymers, poly(methylpentene), styrene-butadiene copolymers, and polyesters having a fluorene group.

In the plastic optical component of the present invention, it is preferable that the inorganic layer has a thickness of 10 to 200 nm, and the organic layer has a thickness of 100 to 2000 nm.

The inorganic and organic layers of the plastic optical component of the present invention are preferably formed through vacuum deposition.

The inorganic layer of the plastic optical component of the present invention is preferably formed through a method selected from the group consisting of sputtering, impedance-controlled reactive sputtering and CVD.

The organic layer of the plastic optical component of the present invention is preferably formed through a method selected from the group consisting of a method comprising the steps of subjecting a precursor to flash evaporation in vacuo and polymerizing the precursor by plasma or UV irradiation; spin coating and CVD.

The present invention also provides an optical unit including at least two lenses having different Abbe numbers, in which at least one of the lenses is a plastic optical component of the present invention.

The optical unit of the present invention preferably includes a lens having an Abbe number of 45-60 and a lens having an Abbe number of 23-35, the lens having an Abbe number of 23-35 is a plastic optical component of the present invention.

In the optical unit of present invention, it is preferable that the lens having an Abbe number of 45-60 be made of glass or alicyclic polyolefins, the lens having an Abbe number of 23-35 be a plastic optical component of the present invention and the optical component's body be made of at least one plastic materials selected from the group of methacrylic resins, acrylic resins including alicyclic ones, polycarbonate resins, polyester resins including aromatic ones, polystyrene resins, acrylonitrile-styrene resins, alicyclic polyolefins, resins containing the tricyclodecane ring, cycloolefinic polymers, poly(methylpentene), styrene-butadiene copolymers, and polyesters having a fluorene group.

The optical unit of the present invention has preferably an auto-focus mechanism.

According to the present invention, there is offered the advantage of easily realizing and providing plastic optical components which retain the superior characteristics of plastic optical components per se such as lightweightness, low cost and productivity and which still exhibit superior moisture barrier properties while experiencing extremely small changes in resolution or other optical performance even if they are subjected to the effect of water in the environment.

When the plastic optical component of the present invention is used as the plastic lens, even in the case of an environmental change, specifically a change in the humidity of the environment, there will occur no uneven refractive index profile in the interior of the lens and, in addition, the lens itself will only undergo a gradual and uniform change in refractive index. In the case where the lens itself undergoes a uniform change in refractive index and if the change is very small, no greater than what occurs due to moisture absorption, a substantial effect on the optical performance of the lens is no more than a change in its focal position and can be cancelled by using an auto-focus mechanism.

Therefore, according to the present invention, one can produce a superior optical unit whose optical characteristics will not be influenced by environmental changes.

BRIEF DESCRIPTION OF THE DRAWINGS

FIG. 3A is a front view for illustrating the shape of the optical component of the present invention shown in FIG. 2 (as it is seen in a direction parallel to the optical axis);

FIG. 3B is a section which is cut in the same direction as FIG. 2 is; and

FIG. 4 shows in concept an exemplary layout of an imaging module using the optical unit of the present invention and an auto-focus mechanism.

DESCRIPTION OF THE PREFERRED EMBODIMENTS

The plastic optical component and optical unit using the same according to the invention are described below in detail with reference to the preferred embodiments shown in the accompanying drawings.

Figure 1A:
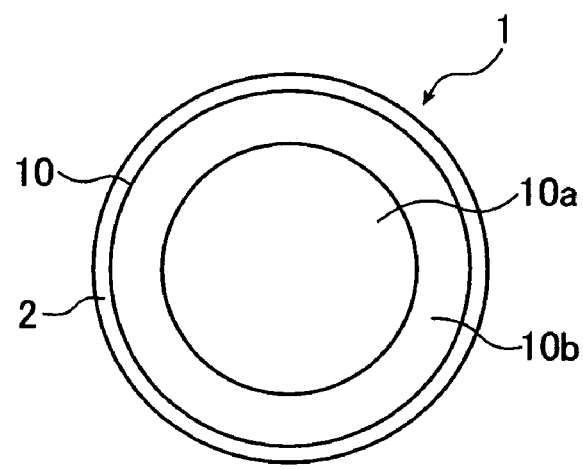
FIG. 1A is a front view showing in concept an embodiment of the plastic optical component of the invention in the form of a lens (as it is seen in a direction parallel to the optical axis)
Figure 1B:
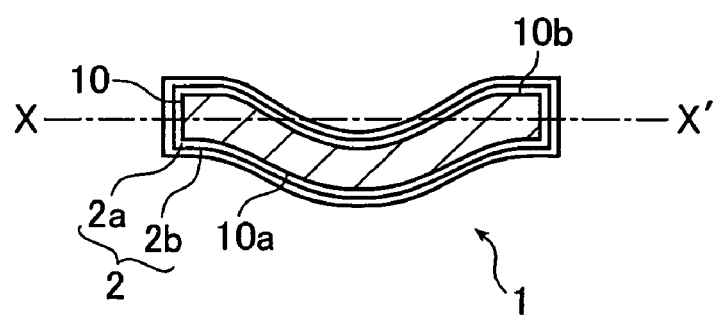
FIG. 1B is a section of the optical component as cut through a plane including the optical axis.

FIGS. 1A and 1B show in concept an embodiment of the plastic optical component of the invention in the form of a lens. FIG. 1A is a front view of the optical component (as it is seen in a direction parallel to the optical axis) and FIG. 1B is a section of the optical component as cut through a plane including the optical axis.

As shown in FIGS. 1A and 1B, an optical component 1 of the invention includes its plastic body (in this case, a lens) 10 and a moisture-proof coating 2 that is directly or indirectly formed at least on the surfaces of the body 10 which are in contact with the outside air.

The expression "a moisture-proof coating that is formed at least on the surfaces of the body which are in contact with the outside air" as used herein means that a moisture-proof coating that is formed on the surfaces of the body which are in contact with the outside air (hereinafter these surfaces are referred to simply as "outside air-contacting surfaces") when the optical component is in use. Therefore, the moisture-proof coating is not necessarily formed on all of the external surfaces of the optical component's body. Alternatively, in the case where a functional coating having a specific function is formed on the outside air-contacting surfaces of the body of the optical component which is in use, the moisture-proof coating may be formed on the functional coating. This corresponds to the case where the moisture-proof coating is indirectly formed on the outside air-contacting surfaces of the optical component's body.

The optical component 1 shown in FIGS. 1A and 1B has the moisture-proof coating 2 formed on all the surfaces of its body 10.

Hereinafter, the "body of the optical component" or the "optical component's body" shall refer to a wide range of known optical components including lenses and the "optical component" shall refer to that body of the optical component which has a moisture-proof coating formed at least on its outside air-contacting surfaces.

The optical component's body 10 shown in FIGS. 1A and 1B assumes the shape of a common plastic lens and includes a lens portion 10a having an optical surface and a flange portion 10b surrounding the lens portion 10a. The optical component 1 shown in FIGS. 1A and 1B has the moisture-proof coating 2 formed on all the surfaces of the optical component's body 10 including the lens portion 10a and the flange portion 10b.

As shown in FIG. 1B, the moisture-proof coating 2 is a multi-layered film including a lower inorganic layer 2a and an upper organic layer 2b.

The inorganic layer 2a mainly serves as a barrier film that protects the moisture-proof coating 2 against moisture.

Various kinds of thin films mainly made of an inorganic material can be used for the inorganic layer 2a, as long as the thin films have sufficient transparency and low or no moisture permeability.

Preferred examples of the inorganic material include a silicon oxide represented by the formula $SiO_x$ ($0<x\leqq2$), a silicon nitride such as $Si_3N_4$, a silicon oxynitride, a metal oxide, a metal nitride, a metal oxynitride, diamondlike carbon and a combination thereof. Specific examples of the metal oxide include $ZrO_2$, titanium oxides such as $TiO_2$, $TiO$ and $Ti_2O_3$; $Al_2O_3$, $Ta_2O_5$, $CeO_2$, $MgO$, $Y_2O_3$, $SnO_2$, $MgF_2$, $WO_3$, and an In/Sn mixed oxide.

Irrespective of the material used to form the inorganic layer 2a, it is preferable that the inorganic layer 2a have the densest possible structure and absorb only a small amount of light having a desired wavelength. Therefore, a vitreous film made of a silicon oxide, a film made of a silicon nitride such as $Si_3N_4$, and a film made of a silicon oxynitride are particularly preferable for the inorganic layer 2a.

In the present invention, the inorganic layer 2a may be made of only one of or two or more of the inorganic materials described above.

There is no particular limitation on the thickness of the inorganic layer 2a, but the inorganic layer 2a has preferably a thickness of 10 to 200 nm. When the inorganic layer 2a has a thickness of less than 10 nm, pinholes may occur, which potentially prevents the desired moisture barrier properties from being achieved, and the thickness of the film may also be uneven depending on the method used for film formation. Furthermore, at thicknesses smaller than 10 nm, the body 10 of the optical component may have a larger surface roughness than the thickness of the inorganic layer 2a, which makes it difficult to form an even film. On the other hand, when the thickness of the inorganic layer 2a exceeds 200 nm, the moisture-proof coating makes no further contribution to the purpose of moisture prevention; on the contrary, a larger thickness requires more time for film formation and hence will lower the production rate, particularly in the case of dry film formation, and residual stress caused in the inorganic layer 2a will increase the chance of cracking.

The method of forming the inorganic layer 2a is not limited in any particular way and one can employ a variety of dry processes such as vacuum evaporation, sputtering, impedance-controlled reactive sputtering, ion plating, CVD (chemical vapor deposition), plasma-enhanced CVD, dual frequency CVD, and catalytic CVD as well as a variety of wet processes including the sol-gel method. A suitable method may be chosen as appropriate for the composition of the inorganic layer 2a to be formed, its thickness, and other factors.

There is also no limitation on the method of applying solutions when one employs wet processes such as the sol-gel method and a variety of coating methods can be used, including dip coating, spray coating and spin coating. If the sol-gel method is adopted, the inorganic layer can be formed by, for example, hydrolyzing alkoxysilane compounds. Alternatively, commercial products may be employed and an example is SolGard™ manufactured by Nippon Dacro Shamrock Co., Ltd.

However, the dry processes that are carried out for the vacuum deposition are preferable for the reasons to be described later. In the dry processes, sputtering, impedance-controlled reactive sputtering, CVD including plasma-enhanced CVD, dual frequency CVD, and catalytic CVD are preferable. When the dry processes are used for film deposition, a film may be formed with the optical component's body rotated in order to enhance the productivity and the adhesiveness of the inorganic layer. For example, when the inorganic layer is formed on the optical component's body 10 shown in FIG. 1B, film deposition may be performed while the body 10 is rotated about the line X-X' in FIG. 1B.

The inorganic layer 2a is excellent in moisture barrier properties but is hard. Therefore, after the inorganic layer 2a is formed, an external stress such as excessive friction or expansion or shrinkage of the optical component's body 10 due to heat or other factors may readily cause cracks or other minor defects. Even during the formation of the inorganic layer 2a, pinholes, cracks and other minor defects may potentially occur. If these minor defects occur, the moisture barrier properties of the inorganic layer 2a are impaired.

In the present invention, the moisture-proof coating 2 is formed as a multi-layered film including the lower inorganic layer 2a and the upper organic layer 2b so that the elastic organic layer 2b functions as a protective film for protecting the inorganic layer 2a against an external stress and expansion/shrinkage of the optical component's body due to heat or other factors. The strength of the moisture-proof coating 2 is thus sufficiently secured to exhibit good moisture barrier properties over a long period of time. Even in the case where pinholes, cracks or other minor defects occur during the formation of the inorganic layer 2a, the organic layer 2b can suitably compensate for such minor defects. As a result, the moisture-proof coating formed has no defect and the moisture barrier properties of the inorganic layer 2a are completely reflected on the moisture-proof coating, which can thus exhibit a very high degree of the moisture barrier properties.

Various kinds of thin films mainly made of an organic material can be used for the organic layer 2b, as long as the thin films have sufficient transparency and a certain degree of elasticity. Thin films based on acrylic resins, methacrylic resins, polyester resins, aromatic polyester resins, polyethylene terephthalate, polyethylene, polypropylene and polystyrene, and combinations thereof are particularly preferable in terms of their low costs and excellent film-forming properties.

In the present invention, the organic layer 2b may be made of only one of or two or more of the organic materials described above.

There is no particular limitation on the thickness of the organic layer 2b, but the organic layer 2b has preferably a thickness of 100 to 2000 nm (0.1 to 2 μm). When the organic layer 2b has a thickness of less than 100 nm, there is a possibility that the organic layer 2b cannot sufficiently function as a protective film. Further, the thickness of the organic layer 2b may be uneven depending on the method used for film formation. When the thickness of the organic layer 2b exceeds 2000 nm, the organic layer 2b functions less as a protective film; on the contrary, a larger thickness requires more time for film formation and hence will lower the production rate, particularly in the case of dry film formation. An extremely increased thickness of the organic layer 2b may cause deterioration of the optical performance due to its shape considerably deviated from the design shape, or due to its uneven thickness depending on the film forming method used.

In addition, the organic layer 2b preferably has good transmission of light rays and low refractive index as its optical characteristics. Low refractive index results in low loss due to surface reflection of incident light, eventually leading to better transmittance of light rays. It is also possible to impart the function as an anti-reflection coating or a hard coating to the organic layer 2b by appropriately carrying out optical design.

The method of forming the organic layer 2b is not limited in any particular way and one can employ a variety of wet processes such as a method comprising the steps of preparing a coating solution having the film forming resin component dissolved or dispersed therein, applying the coating solution and drying the applied film as well as a variety of dry processes such as a method comprising the steps of subjecting a precursor to flash evaporation in vacuo and polymerizing the precursor by plasma or UV irradiation, and CVD. A suitable method may be chosen as appropriate for the composition of the organic layer to be formed, its thickness, and other factors.

In the case of the wet processes which employ coating solutions, there is no limitation on the method of applying coating solutions and a variety of methods can be employed, including spray coating, brush coating and dip coating.

However, the dry processes that are carried out for the vacuum deposition are preferable for the reasons to be described later.

When the dry processes are used, the organic material used to form the organic layer has preferably a molecular weight of 200 to 400, because the organic material whose molecular weight falls within the above range readily evaporates and thereafter condenses on the target (inorganic layer 2a) on which a film is to be formed.

In the present invention, it is preferable to form the inorganic layer 2a and the organic layer 2b by vacuum deposition. The formation of the inorganic layer 2a through vacuum deposition allows the layer 2a formed to be free of minor defects and have excellent moisture barrier properties. Thereafter, the organic layer 2b can be formed by vacuum deposition without causing any minor defects in the formed inorganic layer 2a. Therefore, it is preferable to form the inorganic layer 2a by vacuum deposition and subsequently form the organic layer 2b by vacuum deposition while the vacuum state is maintained. The film formation based on the procedure described above requires only one vacuum evacuation operation, and hence is excellent in productivity.

In the present invention, it is only necessary for the moisture-proof coating to be a multi-layered film including the lower inorganic layer and the upper organic layer, and the moisture-proof coating is not limited to the two-layered film such as the moisture-proof coating 2 shown in FIG. 1B including the inorganic layer 2a and the organic layer 2b. Therefore, the moisture-proof coating may be a four-layered film having an inorganic layer, an organic layer, another inorganic layer and another organic layer formed in this order, or a multi-layered film having more than four layers, as long as the condition that the inorganic layer is always coated with the organic layer is met. For example, a four-layered film that has an organic layer interposed between two inorganic layers prevents any minor defects such as pinholes and cracks that may occur during the formation of one of the inorganic layers from propagating to the other inorganic layer. It is thus considered that, when the two-layered and four-layered films whose inorganic layers are identical in total thickness are compared with each other, the four-layered film has more excellent moisture barrier properties than the two-layered film. A moisture-proof coating having a variety of properties can be obtained by changing the material and the conditions for film formation depending on whether an inorganic layer or an organic layer is formed.

When the moisture-proof coating is a four-layered film or a multi-layered film having more than four layers, the thicknesses of the respective inorganic and organic layers should fall within the ranges described above.

In the optical component 1 of the present invention, the Sherwood number describing the water transfer process as expressed by the following formula:

$$kc \cdot d/D$$

(where kc is the water transfer coefficient [mm/s] in the moisture-proof coating, D is the water diffusion coefficient [$mm^2$/s] in the constituent material of the body of the optical component, and d is the body's length [mm] in the optical axis direction) is in the range of 0.1 to 10 (both inclusive). In the case of the plastic lens (optical component's body) 10 shown in FIG. 1B, d refers to the thickness at the center of the lens portion 10a.

To determine kc, two plates of sample are prepared from a material which is the same as the constituent material of the optical component's body, and the rate of moisture absorption is measured for those plates by the method described in JIS K7209 (corresponding to ISO 62), with and without the moisture-proof coating; kc [mm/s] is calculated from the difference between the moisture absorption rates of the two samples.

To determine the water diffusion coefficient D [$mm^2$/s] in the constituent material of the optical component's body, a plate of sample is prepared from a material which is the same as the constituent material of the optical component's body and measurement is performed by the method described in JIS K7209 (corresponding to ISO 62).

The value of d, or the length (in mm) of the optical component's body in the optical axis direction, may be determined in an exact manner from the shape and size of the body; however, if the body is the plastic lens 10 shown in FIG. 1B, the thickness at the center of the lens portion 10a may be substituted as d.

Since the Sherwood number describing the water transfer process is in the range of 0.1 to 10 (both inclusive), the optical component of the present invention has the advantage that if there should be any moisture absorption or removal due to an environmental change, no unevenness will occur to the water absorbance profile in the interior of the optical component and, hence, no unevenness in the refractive index profile will result.

In the optical component of the present invention, the Sherwood number describing the water transfer process is more preferably in the range of 0.1 to 5 (both inclusive) and most preferably in the range of 0.1 to 2 (both inclusive).

In order that the Sherwood number describing the water transfer process in the optical component of the present invention may be in the range of 0.1 to 10 (both inclusive), the conditions under which the inorganic and organic layers are formed, and in particular the conditions under which the inorganic layer is formed may be chosen as appropriate depending on the method used for film formation. For example, when sputtering is used to form a silicon oxide film as the inorganic layer, impedance-controlled reactive sputtering is carried out at a film deposition pressure of 0.005 Pa to 0.13 Pa by using silicon as the target and oxygen as the reactive gas.

Various sputtering methods such as RF sputtering and DC-pulse sputtering can be used, but DC-pulse sputtering is preferable because of its high film deposition rate.

Various known means can be used to adjust the amount of reaction gas used to carry out impedance control at the film deposition pressure described above, but a piezoelectric valve is preferably used in terms of its high responsiveness and its capability of consistently maintaining the discharge voltage even at a low film deposition pressure.

There is no particular limitation on the discharge voltage in electric discharge through impedance-controlled reactive sputtering that is carried out at the film deposition pressure described above. However, the discharge voltage is preferably in the range of 480 V to 660 V and more preferably 570 V to 630 V in terms of the achievement of consistent discharge and a realistic deposition rate obtained.

The impedance-controlled reactive sputtering at the film deposition pressure described above is preferably carried out in the transition region between the metallic and reactive modes (hereinafter referred to simply as the "transition region"). When the reactive sputtering is performed in the transition region, the deposition rate and hence the productivity can be more enhanced than those in the reactive sputtering commonly performed in the reactive mode. The film deposition pressure can be more reduced than that in the commonly performed reactive sputtering because the reactive sputtering in the transition region uses a smaller amount of reaction gas than that in the commonly performed reactive sputtering. This is preferable to maintain the film deposition pressure in the range described above.

When a silicon oxide film is formed as the inorganic layer through the CVD, film deposition can be performed under the conditions described below according to the procedure described in the well-known literature "Journal of Vacuum Science & Technology A: Vacuum, Surfaces, and Films" (November, 1998, Volume 16, Issue 6, pp. 3190-3198):
CVD device: A dual frequency plasma CVD at 2.45 GHz and 13.56 MHz
Film deposition pressure: 80 mTorr.

The microwave power at 2.45 GHz is 150 W and the radio wave power at 13.56 MHz is adjusted so that the potential difference between the substrate and the portion (choke) where plasma is generated is 150 V. Gas is flown into the chamber of the CVD device at a ratio of $C_6H_{18}Si_2O:O_2:Ar$ of 1:6:3.

Film formation through the CVD is preferably performed so that a film formed has a thickness of at least 30 nm, more preferably at least 100 nm.

The optical component of the present invention suffices to have a moisture-proof coating formed at least on the outside air-contacting surfaces of the optical component's body and it is not essential that the moisture-proof coating be formed on all surfaces of the optical component's body as in the case shown in FIG. 1A, where the optical component is indicated by 1 and its body by 10.

Figure 2:
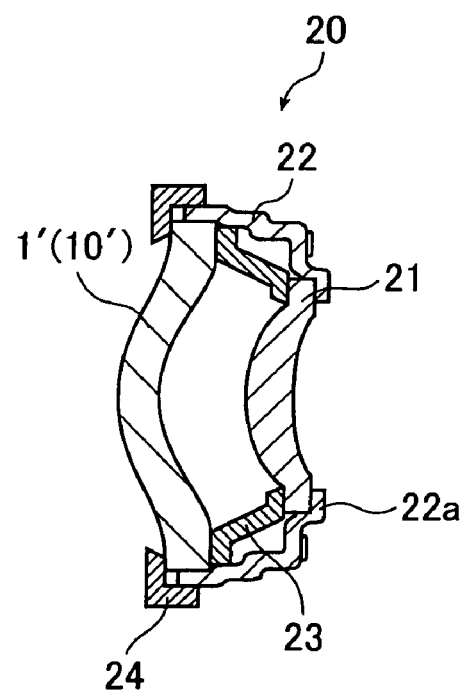
FIG. 2 is a diagrammatic section of an embodiment of the optical unit using the optical component of the invention (as it is cut through a plane including the optical axis)

FIG. 2 is a diagrammatic section of another embodiment of the optical component of the invention (as it is cut through a plane including the optical axis). An optical component in lens form of the invention which is generally indicated by 1' is assembled to make an optical unit 20. The optical unit 20 shown in FIG. 2 is a general optical unit set up for use in a lens mechanism in a silver halide camera or in an imaging module in a digital camera, a video camera or a miniature camera that can be built into a cellular phone. Stated briefly, the optical unit 20 shown in FIG. 2 comprises two lenses 1' and 21 having different Abbe numbers that are assembled into a generally cylindrical lens barrel 22 and fixed in position by means of a lens clamp 24.

In addition, the optical unit 20 shown in FIG. 2 has a spacer 23 interposed between the lenses 1' and 21.

In the optical unit 20 of the present invention, lens 21 has a high Abbe number, specifically, between about 45 and 60. Specific examples of the lens having such an Abbe number include lenses made of glass or alicyclic polyolefins typified by ZEONEX™ manufactured by ZEON Corporation. These lens materials are generally known to have a very low saturated water absorbency not higher than 0.02 wt %. The lens 21 is made of such low-hygroscopicity lens material and does not need to have a moisture-proof coating formed on it.

On the other hand, the lens 1' is the optical component 1' of the present invention and a plastic lens that has an Abbe number sufficient to correct chromatic aberration in combination with the lens 21, specifically an Abbe number of from about 23 to about 35, may be used as the optical component's body 10'.

The setup of the optical unit 20 shown in FIG. 2 is described below more specifically. The lens barrel 22 consists of three cylindrical regions that have a common center but different diameters and which are arranged in the order of decreasing diameter along the optical axis of the optical unit 20. The smallest-diameter cylindrical region of the lens barrel 22 has an annular rib portion 22a formed on its end face to protrude inwardly. The inside of the rib portion 22a serves as an aperture through which incident light (e.g. taking light) is launched.

The lens 21 can be assembled into the smallest-diameter region of the lens barrel 22. In other words, the inside diameter of that region is generally equal to but slightly larger than the outside diameter of the lens 21. The optical component 1' of the invention can be assembled into the largest-diameter region of the lens barrel 22. In other words, the inside diameter of that region is generally equal to but slightly larger than the outside diameter of the optical component 1' of the invention.

The lens 21 is assembled into the smallest-diameter region of the lens barrel 22 on the side where the rib portion 22a protrudes (at the aperture through which incident light is launched), and the flange portion of the lens 21 is brought into contact with the rib portion 22a so as to determine the axial position of the lens 21. On the other hand, the optical component 1' of the invention is assembled into the largest-diameter region of the lens barrel 22.

The spacer 23 is a generally cylindrical member having at opposite ends those portions which contact the lens 21 and the optical component 1' of the invention; as already mentioned, the spacer 23 is inserted between the lens 21 and the optical component 1' of the invention within the lens barrel 22. By choosing the axial length of the spacer 23, the relative positions of the lens 21 and the optical component 1' of the invention in the optical axis direction can be determined properly.

In addition, the lens 21 and the optical component 1' of the invention, as well as the lens barrel 22 and the spacer 23 are all molded in such a way that when the lens 21 and the optical component 1' of the invention are properly assembled into the lens barrel 22, their optical axes are in alignment.

To construct the optical unit 20 shown in FIG. 2, the lens 21, the spacer 23 and the optical component 1' of the invention are sequentially assembled into the lens barrel 22 and the optical component 1' of the invention is pressed toward the rib portion 22a by means of the lens clamp 24. The lens clamp 24 working in that way is fixed to the lens barrel 22 with an adhesive or by other means so that the optical unit 20 is fabricated.

FIG. 3A is a front view of the optical component 1' of the present invention (as it is seen in a direction parallel to the optical axis) and FIG. 3B is a section which is cut in the same direction as FIG. 1B is. Like the optical component's body 10 shown in FIGS. 1A and 1B, the body 10' of the optical component 1' of the present invention shown in FIGS. 3A and 3B includes a lens portion 10'a and a flange portion 10'b.

Further speaking of the optical unit 20 shown in FIG. 2, the optical component 1' of the invention has its flange portion held between the rib portion 22a of the lens barrel 22 and the spacer 23 and the flange portion is prevented from making contact with the outside air. Therefore, one may reasonably assume that the moisture absorption and moisture removal through the flange portion is negligible.

Therefore, as shown in FIG. 3B, the optical component 1' of the present invention has the moisture-proof coating 2 (i.e., the moisture-proof coating 2 including the lower inorganic layer 2a and the upper organic layer 2b) formed only on the surfaces of the lens portion 10'a of the optical component's body 10', and the moisture-proof coating 2 is not formed in the flange portion 10'b. Such structure is acceptable, if the Sherwood number of the optical component 1' describing the water transfer process is in the range of 0.1 to 10 (both inclusive). Due to the difficulty involved in its formation, the moisture-proof coating formed in the flange portion 10'b of the optical component's body 10' may occasionally have poor adhesion. As a result, the moisture-proof coating might readily come off the flange portion 10'b to become a source of contamination during the use of the optical unit 20. Such a problem does not arise in the optical component 1' shown in FIGS. 3A and 3B which has no moisture-proof coating formed in the flange portion 10'b.

Further referring to the optical unit 20 having the setup shown in FIG. 2, if the inside of the lens barrel 22 is held airtight or if the opening in the lens barrel 22 is adapted to be so small that only a small volume of air will flow from the outside into the lens barrel 22, one may reasonably assume that the surface of the lens portion 10'a of the optical component's body 10' of the present invention which faces the interior of the lens barrel 22, namely, the concave face of that lens portion is subjected to very small effects of moisture absorption and moisture removal. In a case like this, the moisture-proof coating 2 need not be formed on that concave face.

On the other hand, depending on the lens forming material used, the high Abbe number lens 21 may be subjected to the effects of moisture absorption and moisture removal. In a case like this, the lens 21 may be formed of the optical component of the present invention.

In order to form the moisture-proof coating only on those outside air-contacting surfaces of the optical component's body 10', namely, in the lens portion 10'a only as in the case of the optical component 1' shown in FIGS. 3A and 3B, the flange portion 10'b may be masked or held in position by a suitable means such as a holder while the moisture-proof coating is being formed.

The optical component of the present invention will not have any uneven profile of refractive index in the interior of its body even if moisture absorption or moisture removal occurs due to an environmental change, so it is suitable for use as a plastic lens that is assembled to fabricate the optical unit 20 of the type shown in FIG. 2.

The present invention also provides an optical unit in which the above-described optical component of the invention has been assembled as a plastic lens. Stated more specifically, the present invention provides an optical unit comprising at least two lenses having different Abbe numbers, at least one of which is the plastic optical component of the present invention. Therefore, FIG. 2 is also a diagram that shows an embodiment of the optical unit of the present invention.

Note that the optical unit of the present invention is not limited in any particular way as long as it comprises at least two lenses having different Abbe numbers, at least one of them being the optical component of the present invention, and it may have a different setup than the optical unit 20 shown in FIG. 2. For example, in an optical unit for high-resolution applications, a plurality of imaging lenses, say, three or more lenses are used in combination to achieve the desired resolving power and precision. The optical unit of the present invention may comprise such three or more lenses as long as at least one of them is the optical component of the invention.

If the optical unit of the present invention comprises three or more lenses, it is not necessary that all of them have different Abbe numbers. As long as it is optically designed such that at least two of the lenses in the optical unit have different Abbe numbers to correct chromatic aberration overall, two or more lenses having comparable Abbe numbers may be incorporated.

If the optical unit of the invention is to be used in a lens mechanism in a silver halide camera or in an imaging module in a digital camera, a video camera or a miniature camera that can be built into a cellular phone, it preferably has an auto-focus mechanism.

The plastic optical component of the present invention will not have an uneven profile of refractive index in its interior even if there occurs moisture absorption or moisture removal in response to an environmental change but the refractive index of the optical component taken as a whole varies gradually in response to the environmental change. Accordingly, an optical unit using this optical component undergoes a change in its optical characteristics in response to the environmental change. However, the change in refractive index is slow and uniform. In the case where the optical component itself which is a plastic lens undergoes a uniform change in refractive index and if the change is very small, not greater than what occurs due to moisture absorption, a substantial effect on the optical performance of the lens is no more than a change in its focal position and can be cancelled by using an auto-focus mechanism. Therefore, the optical unit of the present invention, if it is equipped with an auto-focus mechanism, has outstanding optical characteristics which will not be affected by environmental changes but can be fully exhibited at all times.

Various principles and control techniques are known to be used by the auto-focus mechanism in a lens mechanism in a silver halide camera or in an imaging module in a digital camera, a video camera or a miniature camera that can be built into a cellular phone. While various known auto-focus mechanisms may be employed by the optical unit of the invention, a preferred one is such that based on its image picked up through the optical unit, direct check of the subject is made to see whether it is in focus and if it is not, the properly focused condition is obtained by controlling the axial position of the lens or lenses in the optical unit.

FIG. 4 shows in concept an exemplary layout of an imaging module using the optical unit of the present invention and an auto-focus mechanism. It is a simplified view of the setup of a common digital camera. In an imaging module generally indicated by 50 in FIG. 4, the optical unit 20' is the one of the present invention which comprises at least two lenses having different Abbe numbers, one of which is made of the optical component of the invention. The image passing through the optical unit 20' is picked up by a CCD image sensor 51. The optical image information picked up by the image sensor 51 is output as an electric signal and sent to an AF processing section 52. The AF processing section 52, based on the image information sent from the image sensor 51, checks the subject to see whether it is in focus and sends a drive signal to an actuator 53. The actuator 53, based on the drive signal from the AF processing section 52, moves all or some of the lenses in the optical unit 20' back and forth in the optical axis direction until the properly focused position is attained. A variety of means can be used as the actuator 53 and specific examples include a stepping motor, a linear motor, a piezoelectric device, an electroactive polymer (EAP), etc.

While the optical component of the present invention has been described above with the plastic lens for use in optical units being taken as an example, the optical component of the invention is by no means limited to the plastic lens and encompasses a wide range of known structures for plastic optical components. Hence, aside from the illustrated lens, the optical component of the invention may be chosen not only from among lenses having various other shapes and functions but also from among other known optical elements or components including prisms, optical filters, optical screens, deflectors, polarizers, light reflecting members, finders, glasses, contact lenses, reflectors and curved mirrors. It may also be chosen from among known optical elements or components that are used as assembled into imaging optical systems for use in imaging devices such as cameras (e.g., silver halide camera, digital camera and video camera), image forming apparatuses such as copiers and printers, and various other optical equipment including projectors, telescopes, binoculars and magnifiers.

There is also no limitation on the material of the body of the optical component, the body of the optical component can be formed of and a variety of plastic materials (resin materials) used in known optical elements and ordinary optical components may be employed. To mention a few examples, methacrylic resins (e.g., PMMA), acrylic resins including alicyclic ones, polycarbonate resins, polyester resins including aromatic ones, polystyrene resins, acrylonitrile-styrene (AS) resins, alicyclic polyolefins, resins containing the tricyclodecane ring, cycloolefinic polymers, poly (methylpentene), styrene-butadiene copolymers, and polyesters having a fluorene group, may be employed.

The optical component of the present invention is characterized in that it will not have an uneven profile of water absorbency in its interior; considering this feature, among the plastic materials listed in the preceding paragraph, those which have comparatively high water absorbency, specifically a saturated water absorbency in excess of 0.02 wt %, are preferred and specific examples include methacrylic resins, acrylic resins including alicyclic ones, polycarbonate resins, polyester resins including aromatic ones, polystyrene resins, and alicyclic polyolefins. As already mentioned, there are alicyclic polyolefins that have a saturated water absorbency not higher than 0.02 wt % as exemplified by ZEONEX™; on the other hand, there are alicyclic polyolefins having a saturated water absorbency in excess of 0.02 wt %.

If the optical component of the present invention is to be used as the optical component 1' of the optical unit 20 shown in FIG. 2, its body 10' preferably has an Abbe number sufficient to correct chromatic aberration in combination with the lens 21 having high Abbe number, specifically an Abbe number of 45-60; it is specifically preferred that the optical component's body have an Abbe number of from about 23 to about 35. Suitable examples of materials having such Abbe number are polycarbonate resins and aromatic polyester resins.

The method of forming the body of the optical component also is not limited in any particular way and depending on the plastic material to be used, all known plastics molding techniques including injection molding, injection compression molding and compression molding may be adopted.

The shape and size (length, diameter and thickness) of the optical component's body also are not limited in any particular way and may be chosen as appropriate depending on the use of the optical component under consideration.

In the illustrated optical component for instance, the moisture-proof coating 2 is directly formed at least on the outside air-contacting surfaces of the optical component's body 10. However, this is not the sole case of the present invention but a functional coating having a specific function may be formed between the optical component's body 10 and the moisture-proof coating 2. Alternatively, the functional coating may be formed on the moisture-proof coating 2. Specific examples of the functional coating include a hard coating (scratch-resistant coating), a dyed or colored coating, an antistatic coating, a water-repellent coating, an antifog coating, an anti-oxidation coating, an anti-IR coating, an anti-UV coating, an electrode coating, a transparent conductive coating, an antireflection coating, an abrasion-resistant coating, an antifouling coating and a surface-smoothing coating.

EXAMPLES

On the following pages, the plastic optical component of the invention is described in further detail by means of specific examples.

In order to evaluate the optical performance of the plastic optical component of the invention, the optical unit 20 shown in FIG. 2 was employed in Examples. In the optical unit 20 shown in FIG. 2, the lens 21 was a glass lens having an Abbe number of 56 (the radius of the lens portion was 6.4 mm on the entrance face and 4.9 mm on the exit face; average thickness was 2.9 mm); the optical component's body 10' was a lens made of polycarbonate resin having an Abbe number of 30 (the radius of the lens portion 10' was 9.0 mm on the entrance face and 7.5 mm on the exit face; average thickness was 2.5 mm).

The resolving power of the optical (lens) unit 20 was measured after it was left in a 30% humid environment at 25° C. for one week; the MTF (modulation transfer function) at 50% contrast was 30 lines/mm at the center of the optical axis and 25 lines/mm on the periphery on the average.

Example 1

In this example, like the optical component 1 shown in FIG. 1A, a moisture-proof coating 2 was formed on all surfaces of a lens (optical component's body) 10 made of polycarbonate resin. A silicon oxide film having a thickness of about 70 nm was formed in vacuo by sputtering as the inorganic layer 2a. Sputtering was performed according to the procedure described below. The lens 10 made of polycarbonate resin was disposed in the vacuum chamber so as to face a silicon target. The vacuum chamber was evacuated to a pressure of $4 \times 10^{-4}$ Pa, after which argon gas as the discharge gas was introduced into the vacuum chamber. After the discharge gas was introduced into the vacuum chamber, the internal pressure of the vacuum chamber was adjusted to 0.27 Pa and an electric power of 7 kW for film formation was supplied from a discharging power source to thereby perform presputtering. After 5 minutes had passed from the start of presputtering, oxygen gas was introduced as the reaction gas. After the introduction of the oxygen gas, the amounts of the argon gas and oxygen gas to be supplied were reduced and the final pressure for film deposition was reduced to 0.03 Pa while the discharge voltage was adjusted to 610 V through impedance control, whereby the silicon oxide film having a thickness of about 70 nm was formed on all surfaces of the lens 10.

Subsequently, a dry process was used to form in vacuo an acrylic resin film having a thickness of about 400 nm as the organic layer 2b. More specifically, the acrylic resin film was formed according to the following procedure: A hexanediol acrylate monomer (MW: 226) was discharged as a monomer precursor from a nozzle at a temperature of 280° C. and instantaneously evaporated to be condensed on the inorganic layer 2a. Thereafter, an electron beam was emitted from an electron gun for plasma polymerization to form the acrylic resin film having a thickness of about 400 nm to thereby obtain an optical component in Example 1.

Example 2

In this example, a silicon oxide film having a thickness of 100 nm was formed on all surfaces of a polycarbonate resin lens (optical component's body) through dual frequency CVD, thus forming an inorganic layer.

The silicon oxide film was formed according to the procedure described in the well-known literature "Journal of Vacuum Science & Technology A: Vacuum, Surfaces, and Films" (November, 1998, Volume 16, Issue 6, pp. 3190-3198). The specific procedures used are as follows:
CVD device: A dual frequency plasma CVD at 2.45 GHz and 13.56 MHz
Film deposition pressure: 80 mTorr.

The microwave power at 2.45 GHz was 150 W and the radio wave power at 13.56 MHz was adjusted so that the potential difference between the substrate and the portion (choke) where plasma is generated was 150 V. Gas was flown into the chamber of the CVD device at a ratio of $C_6H_{18}Si_2O:O_2:Ar$ of 1:6:3.

Next, the procedure of Example 1 was repeated to form an acrylic resin film having a thickness of about 400 nm as the organic layer to thereby obtain an optical component in Example 2.

Example 3

The procedure of Example 1 was repeated in this example to form a silicon oxide film having a thickness of about 70 nm as the inorganic layer through vacuum deposition, after which a 10 wt % solution of polymethyl methacrylate (PMMA) in butane was applied through spin coating at 800 rpm for 30 seconds to form a methacrylic resin film having a thickness of about 400 nm as the organic layer to thereby obtain an optical component in Example 3.

Comparative Example 1

In Comparative Example 1, neither the inorganic layer nor the organic layer was formed on the polycarbonate resin lens.

Comparative Example 2

In Comparative Example 2, the procedure of Example 1 was repeated to form a silicon oxide film having a thickness of about 70 nm on the polycarbonate resin lens as the inorganic layer but the organic layer was not formed thereon.

Comparative Example 3

In Comparative Example 3, the inorganic layer was not formed on the polycarbonate resin lens and an acrylic resin film having a thickness of about 400 nm was formed thereon as the organic layer by the procedure described in Example 1.

The optical components obtained in Examples 1 to 3 and Comparative Examples 1 to 3 were then subjected to the determination of the Sherwood number, the endurance test and the evaluation of the optical performance.

Determination of Sherwood Number

The Sherwood number was determined by the procedure described below.

Plate samples (thickness: 1 mm) were prepared from a polycarbonate resin which was the same as the constituent material of the optical component's body. Moisture-proof coatings were formed on the surfaces of the plate samples by the same procedures as above to obtain moisture-proof coating-including samples. The moisture absorption rate of each of the obtained samples was determined according to JIS K7209 (corresponding to ISO 62). More specifically, the samples were dried in a vacuum desiccator at room temperature for 15 days or more and then placed in an environment of 25° C. and 95% RH. The weight changes of each sample during this process were measured with time to determine the moisture absorption rate. The moisture absorption rate of another plate sample on the surfaces of which no moisture-proof coating was formed was measured in the same manner and this is the moisture absorption rate in Comparative Example 1. The water transfer coefficient in each moisture-proof coating (kc) was calculated from the difference between the moisture absorption rate of the sample having the moisture-proof coating and that of the sample having no moisture-proof coating.

To determine the water diffusion coefficient D [mm$^2$/s] in the constituent material of the optical component's body, a plate sample was prepared from a polycarbonate resin which was the same as the constituent material of the optical component's body and measurement was performed by the method described in JIS K7209 (corresponding to ISO 62). As it turned out, D was $5 \times 10^{-6}$ mm$^2$/s.

Since the thickness d at the center of the lens portion of the optical component's body 10 (10') was 2.5 mm (see the foregoing size description), the Sherwood number (Sh) was determined by the following formula:

$$Sh = kc \cdot d/D$$

The moisture absorption rate, kc and Sh obtained by the procedure described above were shown in Table 1.

TABLE 1

|  | Moisture absorption rate (wt. %) | kc (mm/s) | Sh |
|---|---|---|---|
| Example 1 | $1.1 \times 10^{-6}$ | $2 \times 10^{-6}$ | 1 |
| Example 2 | $1.5 \times 10^{-6}$ | $2.8 \times 10^{-6}$ | 1.4 |
| Example 3 | $1.7 \times 10^{-6}$ | $3.2 \times 10^{-6}$ | 1.6 |
| Comparative Example 1 | $4 \times 10^{-6}$ | $2.6 \times 10^{-5}$ | 13 |
| Comparative Example 2 | $3 \times 10^{-6}$ | $5 \times 10^{-6}$ | 2.5 |
| Comparative Example 3 | $3 \times 10^{-5}$ | $2.6 \times 10^{-5}$ | 13 |

Endurance Test

The procedure according to which the plate samples prepared above were maintained at 25° C. and 95% RH for 5 days and then at 25° C. and 0% RH for 5 days was repeated and the states of the moisture-proof coatings were observed visually and with an optical microscope. Each time one cycle of the above procedure ended, the moisture absorption rate was measured in the same manner as above. The measurements of the moisture absorption rate were shown in Table 2. As is clear from Table 2, the moisture absorption rate of the plate sample in Comparative Example 2 increased each time one cycle of the above procedure ended, and deterioration in moisture barrier properties was confirmed. It was observed visually and with an optical microscope that the inorganic layer came off the plate sample of Comparative Example 2 on the twelfth day of the test.

TABLE 2

|  | Moisture absorption rate (wt. %) | | |
|---|---|---|---|
|  | First cycle | Second cycle | Third cycle |
| Example 1 | $1.1 \times 10^{-6}$ | $1.1 \times 10^{-6}$ | $1.1 \times 10^{-6}$ |
| Example 2 | $1.5 \times 10^{-6}$ | $1.5 \times 10^{-6}$ | $1.5 \times 10^{-6}$ |
| Example 3 | $1.7 \times 10^{-6}$ | $1.7 \times 10^{-6}$ | $1.7 \times 10^{-6}$ |
| Comparative Example 1 | $4 \times 10^{-5}$ | $4 \times 10^{-5}$ | $4 \times 10^{-5}$ |
| Comparative Example 2 | $3 \times 10^{-6}$ | $6 \times 10^{-6}$ | $1 \times 10^{-5}$ |
| Comparative Example 3 | $4 \times 10^{-5}$ | $4 \times 10^{-5}$ | $4 \times 10^{-5}$ |

Evaluation of Optical Performance

The optical components in Examples 1 to 3 and Comparative Examples 1 to 3 were thoroughly dried in a desiccator at 50° C. for 7 days and thereafter each assembled as an optical component 1' to make an optical unit 20 shown in FIG. 2. Similarly, a glass lens (having an Abbe number of 56) was assembled as a lens 21 to make the optical unit 20. Subsequently, the individual lenses were finely adjusted in both orientation and lens-to-lens distance to have specified values of resolving power. The optical unit 20 was then left to stand in a 30% humid environment at 25° C. for a week and thereafter placed under conditions of 90% RH and 25° C. to measure time-dependent changes in the resolving power. Using an MTF meter of TRIOPTICS GmbH, resolving power was measured as MTF at 50% contrast. The peripheral resolving power was expressed by MTF as averaged for tangential and sagittal directions. The results of the resolving power measurements are shown in Table 3.

TABLE 3

|  |  | Humidifying time (hr) | | | |
|---|---|---|---|---|---|
|  | Resolving power | 0 | 12 | 24 | 36 |
| Example 1 | Center | 30 | 30 | 30 | 30 |
|  | Peripheral | 25 | 25 | 25 | 25 |
| Example 2 | Center | 30 | 29 | 30 | 30 |
|  | Peripheral | 25 | 25 | 25 | 25 |
| Example 3 | Center | 30 | 29 | 30 | 30 |
|  | Peripheral | 25 | 24 | 25 | 25 |
| Comparative Example 1 | Center | 30 | 25 | 29 | 30 |
|  | Peripheral | 25 | 21 | 23 | 25 |
| Comparative Example 2 | Center | 30 | 30 | 30 | 30 |
|  | Peripheral | 25 | 25 | 25 | 25 |
| Comparative Example 3 | Center | 30 | 25 | 29 | 30 |
|  | Peripheral | 25 | 21 | 23 | 25 |

As is clear from Table 3, the optical units of Examples 1-3 suffered only minimal changes, or drops, in both the central and peripheral resolving powers with the lapse of time from the start of resolving power measurement.

On the other hand, the central and peripheral resolving powers of the optical units of Comparative Examples 1 and 3 returned to the initial levels 36 hours after the start of resolving power measurement; however, after 12 and 24 hours of the measurement, both the central and peripheral resolving powers of the optical units experienced noticeable drops.

What is claimed is:

1. A plastic optical component comprising:
    an optical component's body; and
    a moisture-proof coating which is directly or indirectly formed at least on surfaces of the optical component's body in contact with outside air, and is a multi-layered film including a lower inorganic layer and an upper organic layer,
    wherein Sherwood number describing a water transfer process is in a range of 0.1 to 10, both inclusive.

2. The plastic optical component according to claim 1, wherein the inorganic layer is mainly made of at least one inorganic material selected from the group consisting of a silicon oxide, a silicon nitride, a silicon oxynitride, a metal oxide, a metal nitride, a metal oxynitride and diamondlike carbon, and a combination thereof, and the organic layer is mainly made of at least one organic material selected from the group consisting of an acrylic resin, a methacrylic resin, a polyester resin, an aromatic polyester resin, polyethylene terephthalate, polyethylene, polypropylene and polystyrene, and a combination thereof.

3. The plastic optical component according to claim 1, wherein the inorganic layer is mainly made of at least one inorganic material selected from the group consisting of a silicon oxide, a silicon nitride and a silicon oxynitride, and the organic layer is mainly made of at least one organic material selected from the group consisting of an acrylic resin, a methacrylic resin, a polyester resin, an aromatic polyester resin, polyethylene terephthalate, polyethylene, polypropylene and polystyrene, and a combination thereof.

4. The plastic optical component according to claim 1, the optical component's body is made of at least one plastic materials selected from the group of methacrylic resins, acrylic resins including alicyclic ones, polycarbonate resins, polyester resins including aromatic ones, polystyrene resins, acrylonitrile-styrene resins, alicyclic polyolefins, resins containing the tricyclodecane ring, cycloolefinic polymers, poly (methylpentene), styrene-butadiene copolymers, and polyesters having a fluorene group.

5. The plastic optical component according to claim 1, wherein the inorganic layer has a thickness of 10 to 200 nm, and the organic layer has a thickness of 100 to 2000 nm.

6. The plastic optical component according to claim 1, wherein the inorganic and organic layers are formed through vacuum deposition.

7. The plastic optical component according to claim 1, wherein the inorganic layer is formed through a method selected from the group consisting of sputtering, impedance-controlled reactive sputtering and CVD, the organic layer is formed through a method selected from the group consisting of a method comprising the steps of subjecting a precursor to flash evaporation in vacuo and polymerizing the precursor by plasma or UV irradiation; spin coating and CVD.

8. An optical unit comprising at least two lenses having different Abbe numbers, wherein at least one of the lenses is a plastic optical component according to claim 1.

9. An optical unit comprising a lens having an Abbe number of 45-60 and a lens having an Abbe number of 23-35, wherein the lens having an Abbe number of 23-35 is a plastic optical component according to claim 1.

10. An optical unit comprising a lens having an Abbe number of 45-60 and a lens having an Abbe number of 23-35, wherein the lens having an Abbe number of 45-60 is made of glass or alicyclic polyolefins, the lens having an Abbe number of 23-35 is a plastic optical component according to claim 1 and the optical component's body is made of at least one plastic materials selected from the group of methacrylic resins, acrylic resins including alicyclic ones, polycarbonate resins, polyester resins including aromatic ones, polystyrene resins, acrylonitrile-styrene resins, alicyclic polyolefins, resins containing the tricyclodecane ring, cycloolefinic polymers, poly(methylpentene), styrene-butadiene copolymers, and polyesters having a fluorene group.

11. The optical unit comprising at least two lenses having different Abbe numbers, wherein at least one of the lenses is a plastic optical component according to claim 1 and the optical unit has an auto-focus mechanism.

12. An optical unit comprising a lens having an Abbe number of 45-60 and a lens having an Abbe number of 23-35, wherein lense having an Abbe number of 23-35 is a plastic optical component according to claim 1 and the optical unit has an auto-focus mechanism.

13. An optical unit comprising a lens having an Abbe number of 45-60 and a lens having an Abbe number of 23-35, wherein the lens having an Abbe number of 45-60 is made of glass or alicyclic polyolefins, the lens having an Abbe number of 23-35 is a plastic optical component according to claim 1, the optical component's body is made of at least one plastic materials selected from the group of methacrylic resins, acrylic resins including alicyclic ones, polycarbonate resins, polyester resins including aromatic ones, polystyrene resins, acrylonitrile-styrene resins, alicyclic polyolefins, resins containing the tricyclodecane ring, cycloolefinic polymers, poly(methylpentene), styrene-butadiene copolymers, and polyesters having a fluorene group, and the optical unit has an auto-focus mechanism.

* * * * *